United States Patent

Okada

[15] 3,653,286
[45] Apr. 4, 1972

[54] WORKPIECE SUPPORTING DEVICE
[72] Inventor: Takahito Okada, Aichi, Japan
[73] Assignee: Toyoda Koki Kabushiki Kaisha, Aichi-ken, Japan
[22] Filed: Oct. 23, 1970
[21] Appl. No.: 83,308

[30]   Foreign Application Priority Data

Oct. 24, 1969   Japan..................................44/101562

[52] U.S. Cl...................................................................82/31
[51] Int. Cl..............................................................B23b 23/00
[58] Field of Search..................................................82/31

[56]   References Cited

UNITED STATES PATENTS 3,519,096   7/1970   Lunzer...................................82/31 X 1,921,502   8/1933   Brill..........................................82/31
1,744,780   1/1930   Mathewson................................82/31

*Primary Examiner*—Leonidas Vlachos
*Attorney*—Olon, Fisher & Spivak

[57]   ABSTRACT

A workpiece supporting device comprises a holding shaft carrying at its one end a center adapted to support one end of a workpiece. A holding force is applied against the workpiece by a spring interposed between first and second coaxial sleeves, the first sleeve being operably connected to the other end of the holding shaft through a swing arm. The holding force applied on the workpiece may be varied by adjusting the spring force, which is effected by moving the second sleeve axially. A pointer and a dial scale are connected to the first and second sleeves by rack and pinion mechanisms, respectively, for indicating the positions thereof and accordingly the holding force being applied to the workpiece.

4 Claims, 6 Drawing Figures

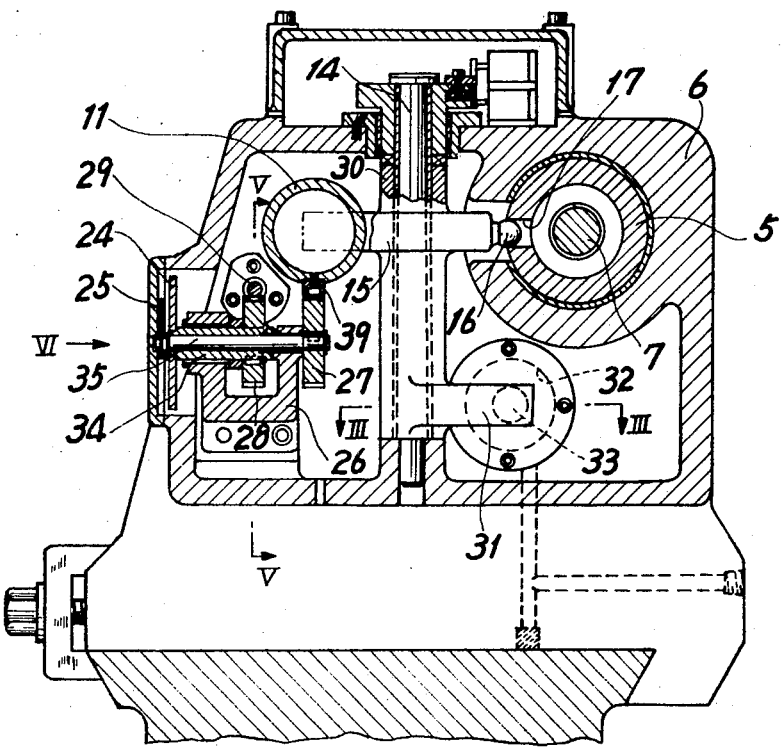
Fig. 2
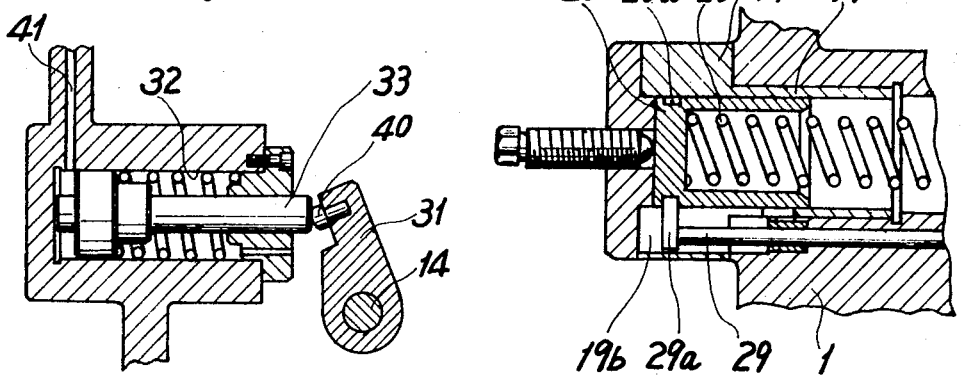
Fig. 3
Fig. 4

WORKPIECE SUPPORTING DEVICE

BACKGROUND OF THE INVENTION

The invention generally relates to workpiece supporting devices, and more particularly to a tailstock wherein the holding force being applied to a workpiece by a tailstock center is easily determined by an operator by observing a dial indicator thereon.

An excessive holding force applied on the workpiece by the tailstock center may cause seizure between the center hole of the workpiece and the tailstock center or even may flex the workpiece, thus degrading the working accuracy thereof. In the case of a deficient holding force, vibration results between the center hole of the workpiece and the tail stock center. Therefore, the holding force must be varied in accordance with the weight or rigidity of the workpiece in order to increase the working accuracy of the workpiece.

The holding force applied on the workpiece is conventionally provided by a compression spring and is selectively varied by adjusting the spring force until the desired holding force, as indicated by a dial indicator, is obtained. In conventional supporting devices wherein the holding force is indicated by the dial indicator, however, the pointer of the dial indicator usually is positioned in different angular positions, such as upwardly and downwardly directed positions, in accordance with the adjustment of the holding force, thereby creating some difficulty in accurately reading the scale.

SUMMARY OF THE INVENTION

It is, therefore, an object of the present invention to provide a workpiece supporting device having an easily readable dial indicator for indicating the holding force being applied on a workpiece.

Another object of the present invention is to provide a workpiece supporting device having a dial indicator for indicating the holding force being applied on a workpiece, wherein the dial scale of the dial indicator is rotated in accordance with an adjustment being made of the holding force along with the pointer of the dial indicator in a relatively narrow angular range.

BRIEF DESCRIPTION OF THE DRAWINGS

Other objects, features and attendant advantages of the present invention will be more fully appreciated as the same becomes better understood from the following detailed description when considered in connection with the accompanying drawings, in which like reference numerals designate like or corresponding parts throughout the several views, and wherein:

FIG. 2 is a sectional side view taken along the line II—II of FIG. 1;

FIG. 3 is a partial sectional view taken along the line III—III of FIG. 2;

FIG. 4 is a partial sectional view taken along the line IV—IV of FIG. 1;

DETAILED DESCRIPTION OF A PREFERRED EMBODIMENT

Figure 1:
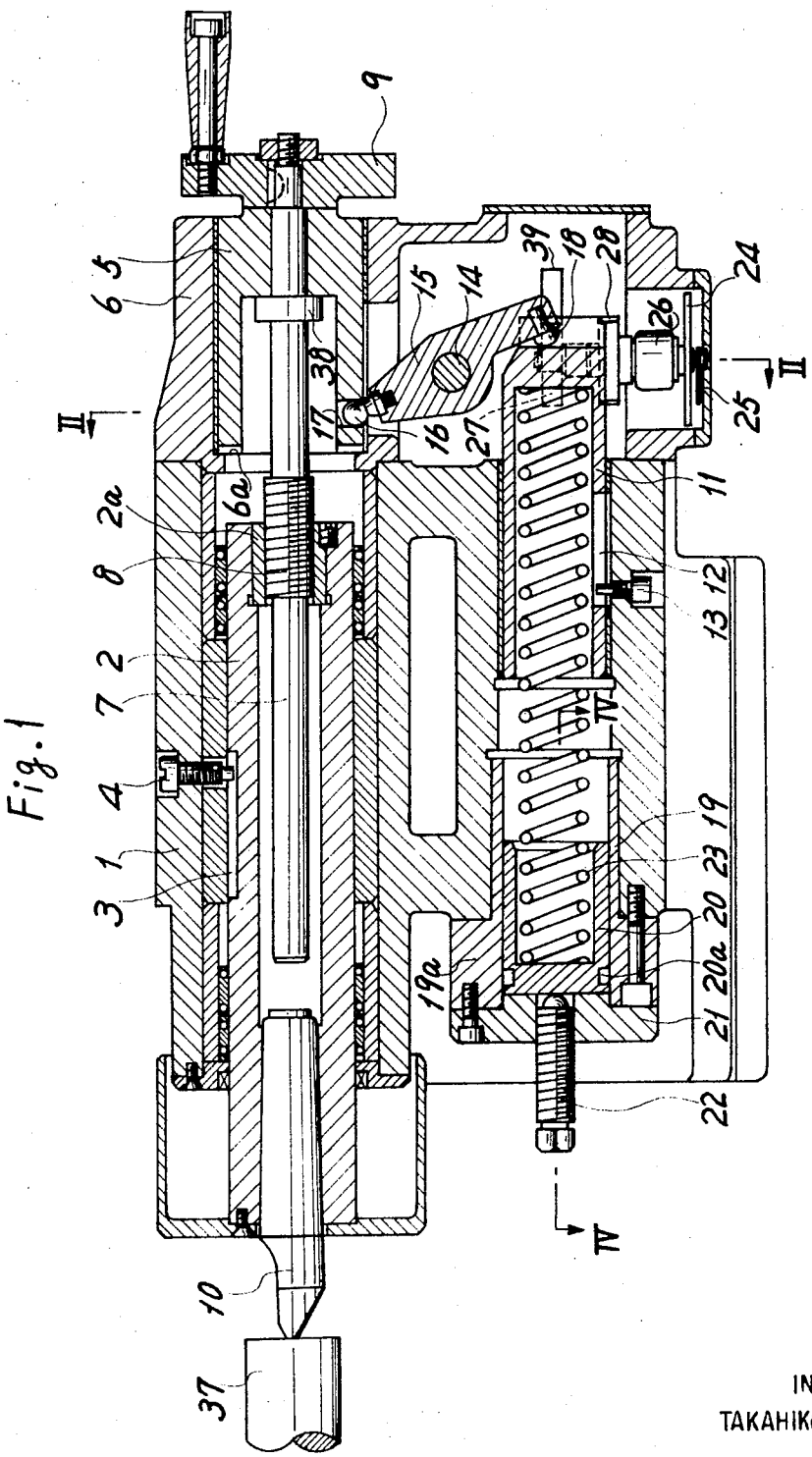
FIG. 1 is a sectional plan view showing a preferred embodiment of a workpiece supporting device constructed according to the present invention.

Referring now to the drawings and particularly to FIGS. 1 and 2 thereof, there is shown a tailstock housing 1 in which a hollow holding shaft 2 carrying a tailstock center 10 at one end thereof for supporting an end of a workpiece 37 is slidably received. A key member 4 threaded in the housing 1 is fitted into a key way, or slot, 3 formed in the shaft 2 for preventing the shaft 2 from rotating and for limiting the axial movement thereof. A push shaft 5 supporting a feed shaft 7 in an axial bore therein is slidably received in a casing 6 secured to the housing 1. The feed shaft 7 has an externally threaded portion 8 which engages an internally threaded sleeve 2a fixedly received in the inner end of hollow shaft 2 opposite the tailstock center-carrying end thereof. The end wall of shaft 5 is clamped between a flange 38 formed on shaft 7 and a hand wheel 9 secured to the end of shaft 7 positioned outside the housing 1.

A radial opening 17 is provided in the peripheral wall of the push shaft 5 for receiving a spherical head 16 secured to one end of a swinging, or pivotable, arm 15. Thus, the push shaft 5 is prevented from rotating, and rotation of the hand wheel 9 causes the holding shaft 2 together with center 10 supported therein to move in an axial path through the threaded engagement of threaded portion 8 of the push shaft-supported feed shaft 7 and the sleeve 2a. Moreover, rotation of the pivotal arm 15, as described hereinbelow, causes axial movement of the push shaft 5, and of the holding arm 2 and tailstock center 10 as well, which are indirectly connected thereto through the shaft 7 and sleeve 2a.

As shown in Figure 2, the swinging arm 15 is integrally formed with an elongate transverse sleeve 30 which is rotatably received on a vertical shaft 14 mounted in the casing 6. Thus, the swinging arm 15 may be swung, or pivoted, about the shaft 14.

Another operating arm 31 is integrally formed on the lower end of the sleeve 30 on the same side as the spherical head 16 relative to the shaft 14. This operating arm 31 has an abutment 40 on one end which is adapted to engage a piston rod 33 disposed in a cylinder 32, as shown in FIG. 3. When a pressurized fluid is introduced into the cylinder 32 through a radial passage 41, the piston rod 33 is caused to be moved therein against the abutment 40 of the operating arm 31 to rotate the sleeve 30 and the swinging arm 15 integrally formed thereon in a clockwise direction, as viewed in FIG. 1. The clockwise rotation of arm 15 causes rightward movement of push shaft 5 to the full extent permitted, and accordingly of the tailstock center 10 also, which is indirectly connected thereto, to enable the workpiece 37 to be initially located in a supporting position.

In the housing 1 there is fixedly received in parallel relationship with the holding shaft 2 a bushing member 19 having a through bore therein for slidably receiving a sleeve 20. An end cap 21 is bolted to a flange 19a integrally formed on the bushing member 19 to limit movement of the sleeve 20 in the leftward direction, as viewed in FIG. 1. An adjusting bolt 22 is threaded into the end cap 21 and contacts a closed end of sleeve 20 to permit adjusting the position of sleeve 20 axially within the bushing member bore.

Another sleeve 11, being closed at one end, is also slidably received in the housing 1 in co-axial relation with the sleeve 20. A key member 13 threaded in the housing 1 is fitted into a key way, or longitudinal slot, 12 formed in the sleeve 11 to permit axial movement of the sleeve 11, while preventing the same from rotating. A compression spring 23 is disposed within the sleeves 11 and 20 between the closed ends thereof to continuously urge them in opposite directions. The closed end of the sleeve 11 engages an abutment 18 secured to the swinging arm 15 at a position diametrically opposite of the spherical head 16 with respect to the supporting shaft 14. The sleeve 11 also has a rack member 39 secured thereto and extending axially from the closed end thereof, as best shown in FIGS. 1 and 2, whereby the rotation of the swinging arm 15 also causes axial movement of the sleeve 11 and the rack member 39, as well as of the push shaft 5.

Referring now to FIG. 4, the sleeve 20 is shown being provided with an annular groove 20a in the outer periphery thereof for supporting a member 29a in press-fit relation. The member 29a is received in an axial slot 19b formed in the bushing member 19 and carries an elongate, axially extending rack member 29 which is movably disposed in the housing 1. When the sleeve 20 is moved to the right by adjustment of the adjusting bolt 22 to increase the force of spring 23 and thereby to increase the holding force of the tailstock center 10 being applied on the workpiece 37, the rack member 29 is also moved to the right.

Figure 5:
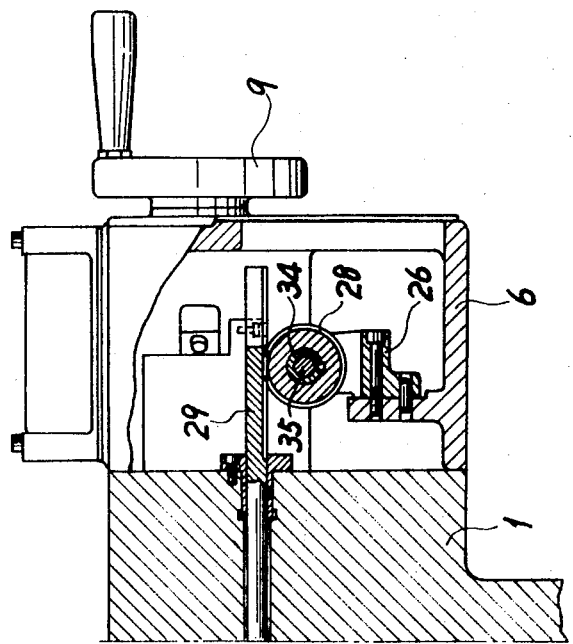
FIG. 5 is a partial front view, partly in section, taken along the line V—V of FIG. 2.

As shown in FIGS. 2 and 5, a bracket 26 is secured to the casing 6, and slidably supports a hollow sleeve 34 at one projecting end, and a shaft 35 at another spaced projecting end, the shaft 35 also being slidably received within the sleeve 34. The sleeve 34 carries at one end a circular dial scale 24 and at its other end a gear 28 which operatively meshes with the rack member 29. The shaft 35 carries a pointer 25 at the end thereof juxtapositioned with the dial scale 24, and at its other end a gear 27 in mesh with the rack member 39. Therefore, the dial scale 24 is rotated in accordance with axial movement of the sleeve 20, while the pointer 25 is rotated in accordance with axial movement of the sleeve 11.

In operation, when the workpiece 37 is not located in its supporting position, the cylinder 32 is not supplied with the pressurized fluid. Thus, the outer end face of sleeve 20 is engaged with the inner end face of the end cap 21 and the swinging arm 15 is swung counterclockwise, as observed in FIG. 1, by the force of spring 23, operating through the closed end wall of sleeve 11 and the abutment 18 on the swinging arm, to cause the inner end face of shaft 5 to engage the shoulder 6a of casing 6, whereby the tailstock center 10 is in its forward end position. At this time, the pointer 25 is positioned at 25a, shown in dotted line fashion in FIG. 6, to indicate the minimum value of the holding force being applied by the tailstock center 10. Thereafter, when the cylinder 32 is supplied with pressurized fluid, the piston rod 33 moves the operating arm 31 to rotate the sleeve 30 and the swinging arm 15 integrally formed thereon clockwise to move the push shaft 5 to the right. The tailstock center 10 is thus retracted by the feed shaft 7 and the holding shaft 2 as the same are moved with the push shaft 5 until the center 10 occupies the extremely rightward position capable of supporting the workpiece 37.

The clockwise rotation of swinging arm 15 also causes leftward movement of sleeve 11 together with the rack member 39. The leftward movement of rack member 39, as viewed in FIG. 1, causes, in turn, counterclockwise rotation of pointer 25 to the position shown at 25b in FIG. 6, to indicate that the tailstock center 10 is fully retracted.

When the workpiece 37 is located in its supporting position and is fitted into a headstock center not shown, the cylinder 32 may be exhausted of the pressurized fluid. This causes the swinging arm 15 to be rotated counterclockwise by the force of spring 23 to move the push shaft 5, feed shaft 7, holding shaft 2 and the tailstock center 10 to the left as a unit to engage and support the workpiece 37, as shown in FIG. 1, applying the necessary holding force thereon. In this case, the tailstock center 10 is prevented from being further moved to the left by its engagement with the workpiece 37, with the result that there is a clearance between the inner end face of shaft 5 and the shoulder 6a of casing 6. At this time, the pointer 25 is positioned as shown by the solid line form in FIG. 6, indicating that a relatively small holding force is being applied to the workpiece 37.

Under normal conditions, the holding force on the workpiece must be further increased, although there is no problem in the event that the relatively small holding force described above is available for working operations. The sleeve 20 is therefore moved to the right by adjustment of adjusting bolt 22 to further compress the spring 23. Upon further compression of spring 23, the holding force on the workpiece is increased by means of the swinging arm 15, shafts 5, 7 and 2, and the tailstock center 10. At the same time, rightward movement of the sleeve 20 causes clockwise rotation of gear 28 together with dial scale 24, as viewed in FIGS. 5 and 6, by means of rack member 29, so that the pointer 25 indicates a relatively large value on the dial scale 24, corresponding to the relatively greater holding force being applied on the workpiece 37. Therefore, the operator can adjust the adjusting bolt 22, while observing the value indicated by pointer 25 on the dial scale 24, so that the workpiece may be supported by the tailstock center with a predetermined optimum holding force.

Figure 6:
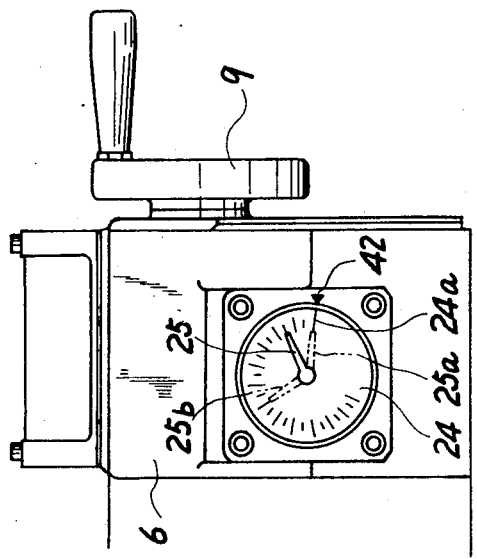
FIG. 6 is a partial front view taken in a direction indicated by the arrow VI of FIG. 2.

In this embodiment, when the tailstock center 10 is not fully engaged with the workpiece 37, and when the sleeve 20 occupies a position wherein it is spaced apart from the inner face of end cap 21 because of an adjustment of the bolt 22 has been made, and the inner end face of push shaft 5 engages the shoulder 6a of casing 6, the pointer 25 is positioned at 25a as shown in FIG. 6. That full engagement has not been made is thus readily apparent, since this position of the pointer 25 indicates normally that no workpiece is located between the headstock and tailstock, or that an applying force of minimum value is being applied to a workpiece. Therefore, an index mark 42 is set out on casing 6 at a position corresponding to the position 25a of pointer 25, whereby the operator can easily inspect whether or not the tailstock center 10 is in full engagement with the workpiece 37. Rotation of the hand wheel 9 then permits the push shaft 5 to be moved back away from the shoulder 6a of casing 6 to bring the tailstock center 10 into full engagement with the workpiece 37.

While the invention has been described by means of the specific embodiment, it should be understood that the novel characteristics of the invention may be incorporated in the other structural forms without departing from the spirit and scope of the invention. Accordingly, it is to be understood that within the scope of the appended claims, the invention may be practiced otherwise than as specifically described herein.

What is claimed as new and desired to be secured by letters patent of the United States is:

1. In a device for supporting a workpiece including a housing, a holding shaft slidably but non-rotatably received in said housing, a center carried on one end of said holding shaft and adapted to support one end of said workpiece and means for adjusting an axial position of said holding shaft by threaded engagement therewith, the improvement comprising:

a swinging member rotatably supported on a shaft member mounted in said housing and being connected at one end thereof to said adjusting means;

first and second coaxially disposed sleeve members slidably received in said housing in parallel relationship with said holding shaft;

resilient means interposed between said first and second sleeve members for normally urging said sleeve members apart;

said first sleeve member being engaged with the other end of said swinging member for applying a holding force through said swinging member, said adjusting means and said holding shaft to said workpiece;

means for adjusting the axial position of said second sleeve member to vary the holding force applied on said workpiece;

a rotatable pointer operably connected to said first sleeve member to be rotated by axial movement thereof; and a rotatable dial scale associated with said pointer and operably connected to said second sleeve member to be rotated by axial movement thereof caused by said adjusting means for said second sleeve member.

2. A workpiece supporting device as set forth in claim 1, wherein said pointer and said dial scale are connected to said first and second sleeve members by rack and pinion mechanisms, respectively.

3. A workpiece supporting device as set forth in claim 1, further comprising fluid actuated means for rotating said swinging member against said resilient means to retract said center from said workpiece.

4. A workpiece supporting device as set forth in claim 1, further comprising an index mark on said housing juxtapositioned with said dial scale for indicating the applying force of minimum value regardless of the angular position of said dial scale when said pointer is directed to said index mark.

* * * * *